June 20, 1944.  J. R. ALMOND ET AL  2,351,732
ROTARY VALVE
Filed May 29, 1940

INVENTOR.
JOHN R. ALMOND &
BY HAROLD R. FITZGERALD

Patented June 20, 1944

2,351,732

UNITED STATES PATENT OFFICE 2,351,732

ROTARY VALVE

John R. Almond, Cleveland, and Harold R. Fitz Gerald, Rocky River, Ohio, assignors to The Midland Steel Products Company, Cleveland, Ohio, a corporation of Ohio Application May 29, 1940, Serial No. 337,892

3 Claims. (Cl. 251—84)

This invention relates to new and useful improvements in oscillatory or rotary valves and the important object of the invention is to provide a leakproof valve which requires no lapping of the seating surfaces.

Another important object of the invention is to provide a ported metallic surface, seated upon which is an oscillatory valve body constructed from a pliable and deformable material having both elastic and lubricating characteristics so that it will absolutely seal the seating surface and prevent any possible leakage of the medium through the valve.

A further object of the invention is to provide a valve structure especially adaptable for use in a fluid pressure apparatus in which pressure holds the valve body tightly upon its seat.

Another object of the invention is to generally simplify valve construction of this type and it is to be understood that it may be used for controlling other fluid pressures.

Other objects and advantages of the invention will become apparent during the course of the following description.

In the accompanying drawing forming a part of the application and wherein like numerals are employed to designate like parts throughout the several views.

Figure 1:
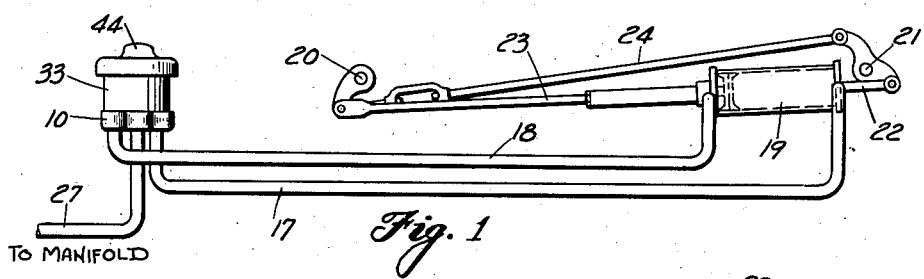
Figure 2:
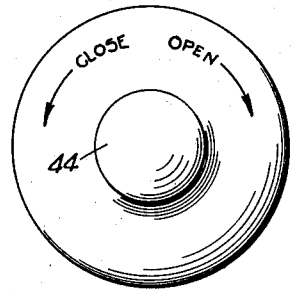
Figure 6:
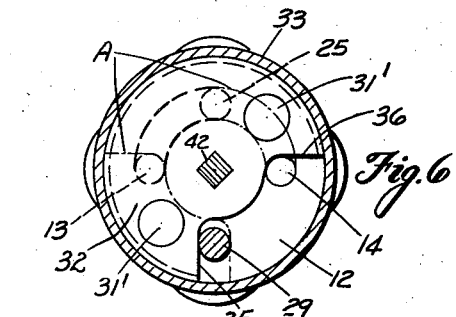
Figure 3:
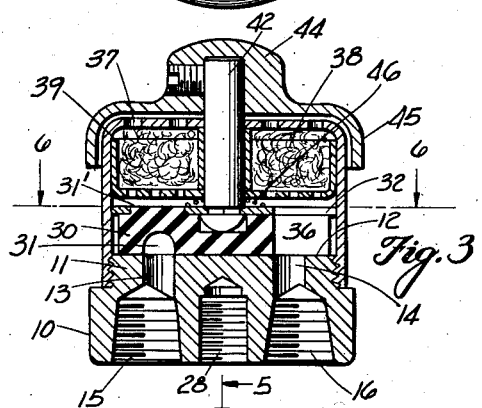
Figure 5:
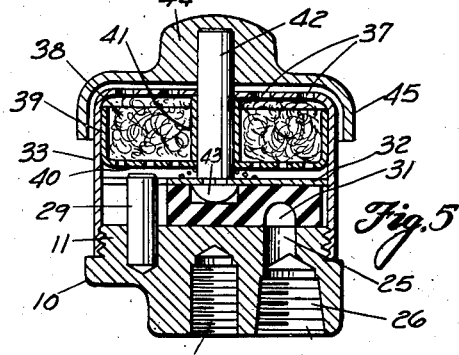
Figure 4:
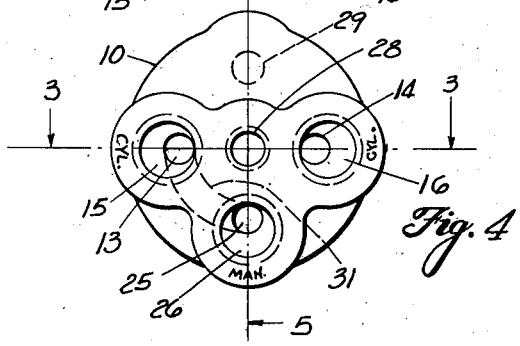
Figure 7:
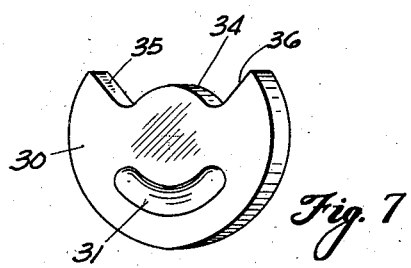

Fig. 1 is a schematic view showing the improved valve in a vacuum system for opening and closing bus doors, Fig. 2 is a top plan of the improved valve, Fig. 3 is a longitudinal section through the valve taken on the line 3—3 of Fig. 4, Fig. 4 is a bottom elevation of the valve, Fig. 5 is a transverse section taken on the line 5—5 of Fig. 4, Fig. 6 is a transverse section taken on the line 6—6 of Fig. 3, Fig. 7 is a perspective view of the improved valve body.

Referring more particularly to the drawing, the improved valve comprises a metallic base 10 having a reduced externally screw threaded annular extension 11, the inner plane seating surface 12 thereof being provided with a pair of diametrically disposed ports 13 and 14 terminating in enlarged threaded recesses 15 and 16 for the connection of pipes 17 and 18 respectively leading to opposite ends of an actuating cylinder 19, which in this instance and for the purpose of illustration is shown for operating a pair of door posts 20 and 21 of a school bus. The cylinder 19 in this instance is a bodily movable floating cylinder, one end of which is pivotally connected by a link 22 to a lever secured to one door post 21, while the piston rod 23 is pivotally connected to a crank arm keyed to the other door post 20 in order that pressure entering the cylinder 19 through pipe 17 will move the doors to a closed position, and when led into the opposite end of the cylinder through pipe 18, will cause the doors to simultaneously open. A diagonally arranged adjustable link 24 connects the cranks of the door posts to insure simultaneous action of the doors should either tend to stick.

The base 10 of the valve is also provided with a port 25 extending through the seating surface 12 halfway between the ports 13 and 14 and terminates in an enlarged outer threaded end 26 by which a pipe 27 is connected to a source of suction such as the intake manifold of an internal combustion engine. The base 10 is also provided with a central threaded recess 28 to provide means for mounting the valve casing upon a threaded stud not shown. Extending perpendicularly from the plane seating surface 12 of the base is a stop pin 29 which is located diametrically opposite the position of the suction port 25 and therefore halfway between the two ports 13 and 14.

Adapted to seat for oscillation upon the plain machined metallic surface 12 of the base to control the parts therethrough, is a relatively thick resilient disk or valve body 30. In order that the valve will require absolutely no lapping-in operations between the valve seating surfaces, which have heretofore been necessary in all types of rotary or oscillatory valves, the valve disk 30 is made of a tough elastic synthetic composition, which, unlike rubber, is unaffected by moisture, gasoline or its vapors and has self lubricating characteristics and possesses a low coefficient of friction. This composition is yieldable under pressure and returns to its original condition without permanent set or cracking. It is tough, pliable and possesses such wear resisting qualities as to give it long life. This composition is preferably made from a "neoprene" or "DuPrene" base derived from petroleum or coal tar products combined with ground up or masticated leather and mica. Under pressure this composition is deformable to adapt itself to the contours and irregularities of any surface upon which it is mounted.

The under or seating surface of the valve body 30 is provided with an arcuate bypass recess 31 which is of an extent to equal the distance between either port 13 or 14 and the suction port 25. The upper face of the valve body 30 is provided with a pair of projections 31' which extend through and snugly fit apertures in a thin metallic plate 32 which is of the same diameter as the cup-shaped casing 33 so as to centralize the valve body 30 on its seating surface 12 with slight clearance between the valve body and the casing as best shown in Figs. 3 and 5. This disk 32 may be attached to the composition valve body in any way desired, as by molding or actual embedment in the body. The center of the disk 32 is provided with a polygonal opening 33 for a purpose which will be presently described. Both the valve body 30 and the disk 32 are provided, diametrically opposite the recess 31, with a segmental cutout portion 34 defining a pair of spaced shoulders 35 and 36 which are adapted to alternately engage opposite sides of the stop pin 29 for limiting the oscillation of the valve body to two positions; one connecting the ports 13 and 25 as shown in dotted lines in Fig. 6 while the other position shown in dot and dash lines A in the same figure, causes communication of the ports 14 and 25. In any position of the valve body 30 it will be obvious that suction is constantly exercised, through the port 25 which is always in communication with the recess 31 and has a tendency to hold the oscillatory valve 30 down upon its seating surface 12 of the base, to prevent leakage.

The open end of the cup-shaped casing 33 is internally threaded to receive the reduced threaded portion 7 of the base and the top of this casing is provided with a series of breather perforations 37 and a central aperture. In order to filter the air coming through the breather perforations 37, a wad of filtering material 38 such as hair or the like is held against the underside of the casing cup by a second cup-shaped retainer member having an annular flange 39 snugly engaging the interior of the casing 33 and a perforated bottom 40 having a central perforation. A spacer sleeve 41 is positioned between the top of the casing and the perforated bottom 40 of the retainer cup with its opening in registration with the central openings in these members for the passage of a valve stem 42. The inner end of this valve stem is provided with a polygonal portion extending through the polygonal aperture in the plate 32 and a head or screw 43 which fits in a central depression of the valve body for fastening the body and stem together. The outer end of the valve stem extends exteriorly of the valve casing and is provided with an operating knob or cap 44 preferably having a depending annular flange 45 surrounding the side of the valve casing 33 but spaced therefrom so that air may pass between the casing and cap to enter the breather openings 37 and filter to communicate at all times with the recess 34 of the valve body. Thus, either port 13 or 14 can be placed in communication with the atmosphere by reason of the provision of the cutout portion 34. A spiral spring 46 may be interposed between the bottom 40 of the retainer and the valve plate 32 to add any desired degree of seating pressure to the valve body 30.

While the valve has been illustrated in a suction hookup, it will be understood that it can also be used in conjunction with the control of fluids under pressure by having the pressure enter the valve through the air filter 36 so as to be exercised on the upper face of the valve 30. In such case the port 25 will serve as the exhaust port and may be connected with either port 13 or 14 to exhaust either end of the cylinder.

It will also be understood that various changes in the shape, size and relation of parts may be resorted to without departing from the spirit of the invention or the scope of the appended claims.

We claim:

1. A non-lapped valve comprising a stationary metallic surface having a pair of ports and a stop pin projecting therefrom, a ported relatively thick elastic valve disk oscillatable upon said surface and having a segmental cutout portion to alternately uncover said ports, a metallic disk of the same shape as said elastic disk secured thereto and having a segmental cutout portion providing spaced shoulders forming stops alternately engageable with said pin, and means for turning said disk upon its axis.

2. In a rotary valve requiring no lapping-in operations, a stationary metallic non-lapped ported seating surface, and an elastic non-metallic valve disk of a composition derived from petroleum or coal tar products combined with masticated leather and mica and having a ported seating surface pressed against the seating surface of said metallic stationary part and being oscilltable thereon.

3. In a rotary valve, a stationary seating surface, having an intermediate port and a pair of ports arranged on opposite sides of said intermediate port and extending from the same face of said seating surface, and a valve disk resiliently urged toward and oscillatable upon said seating surface, the face of said disk engaging said seating surface having an arcuate groove therein for connecting either one of said pair of ports with said intermediate port, said valve disk having a segment of its periphery cut out to define a port having spaced abutments, and a pin secured to the seat and adapted to abut the abutments of said disk to stop oscillation of the disk for registration of the cutout segment with either of said pair of ports of the seat, while the other of said pair of ports is connected by said groove with said intermediate port.

JOHN R. ALMOND.
HAROLD R. FITZ GERALD.